United States Patent
Wirth, Jr. et al.

(10) Patent No.: US 6,273,652 B1
(45) Date of Patent: Aug. 14, 2001

(54) PLUG CUTTER WITH RADIAL RELIEF AND PLUG EJECTING PORTION

(75) Inventors: John Wirth, Jr., Dubois; Jay L. Sanger, Casper; Mark K. McCool, Casper; Paul Brutsman, Casper, all of WY (US)

(73) Assignee: Woodworker's Supply, Casper, WY (US)

( * ) Notice: Subject to any disclaimer, the term of this patent is extended or adjusted under 35 U.S.C. 154(b) by 0 days.

(21) Appl. No.: 09/447,436

(22) Filed: Nov. 23, 1999

Related U.S. Application Data
(60) Provisional application No. 60/153,083, filed on Sep. 10, 1999.

(51) Int. Cl.[7] .................................................. B23B 51/05
(52) U.S. Cl. ...................... 408/203.5; 408/204; 408/205
(58) Field of Search ............................... 408/203.5, 204, 408/205, 207, 703

(56) References Cited

U.S. PATENT DOCUMENTS

| | | |
|---|---|---|
| 117,786 | 8/1871 | Kniffen . |
| 473,231 | 4/1892 | Leffel . |

(List continued on next page.)

FOREIGN PATENT DOCUMENTS

| | | |
|---|---|---|
| 293 770 | 8/1916 | (DE) . |
| 514 622 | 12/1930 | (DE) . |
| 803 130 | 7/1949 | (DE) . |
| 1 040 092 | 10/1953 | (FR) . |
| 2 535 635 | 5/1984 | (FR) . |
| 2 635 032 | 2/1990 | (FR) . |
| 2 151 182 | 7/1985 | (GB) . |
| 57-96710 | 6/1982 | (JP) . |

OTHER PUBLICATIONS

"Power Tool Accessories" Catalog from the Primark Tool Group, p. 206 (1999).

"Genuine Snug–Plug Cutters", Fine Woodworking, No. 104, Feb. 1994, Newton, CT, p. 115.

W.L. Fuller Inc., Condensed Catalog 20A, Oct. 1988 pp. 11 and 12 are back cover.

W.L. Fuller Inc., Catalog Twenty Three, 1994, pp. 33 and 34 and back cover.

Trend 1993/94 Routing Technology Catalog, pp. 57 and 59.

Woodworker's Supply, Inc., Catalog #85, Jun. 1993, p. 128.

*Primary Examiner*—Daniel W. Howell
(74) *Attorney, Agent, or Firm*—Pillsbury Winthrop LLP

(57) ABSTRACT

A plug cutter is described that is rotatable about an axis of rotation. the plug cutter has a main body having a longitudinal axis coinciding with the axis of rotation. The main body defines a bore extending axially therein. A shank extends axially from one end of the main body along the axis of rotation. A plurality of cutting blades extend axially from the opposite end of the main body and each terminate in a distal end. The plurality of blades are adapted to cut a plug from a piece of stock as the plug cutter is rotated about the axis of rotation and advanced axially into the piece of stock. Each of the blades has leading and trailing edges. Each of the blades also has an inner surface and a radially relieved portion facing the bore. The radially relieved portion begins at a relief start position and ends at a relief end position so that, as the plug cutter cuts the plug, a gap is defined between an outer surface of the plug being cut and the radially relieved portion. The plug cutter also includes a plug ejecting portion extending through the main body to permit removal of the plug from the plug cutter. Finally, the bore may be tapered inwardly or outwardly from the blades to the main body.

24 Claims, 3 Drawing Sheets

U.S. PATENT DOCUMENTS

| | | |
|---|---|---|
| 475,560 | 5/1892 | Heydenreich . |
| 476,312 | 6/1892 | Resche . |
| 1,623,927 | 4/1927 | Lenhardt . |
| 2,027,139 | 1/1936 | Abramson et al. . |
| 2,126,476 | 8/1938 | Koonz . |
| 2,748,817 | 6/1956 | Stearns . |
| 2,978,002 | 4/1961 | Ransom . |
| 3,130,763 | 4/1964 | Schlosser et al. . |
| 3,559,513 | 2/1971 | Hougen . |
| 3,611,526 | 10/1971 | Scribner . |
| 3,870,431 | 3/1975 | Luckenbill . |
| 3,966,349 | 6/1976 | Osman et al. . |
| 4,063,844 | 12/1977 | Pessia . |
| 4,295,763 | 10/1981 | Cunniff . |
| 4,452,554 | 6/1984 | Hougen . |
| 4,538,944 * | 9/1985 | Hougen ................................ 408/206 |
| 4,573,838 | 3/1986 | Omi et al. . |
| 4,595,321 | 6/1986 | Van Dalen . |
| 4,693,644 | 9/1987 | Takahashi . |
| 4,767,244 | 8/1988 | Peterson . |
| 4,798,503 | 1/1989 | Huju . |
| 5,213,456 | 5/1993 | Lee . |
| 5,217,334 | 6/1993 | Miyazaki et al. . |
| 5,401,125 | 3/1995 | Savack et al. . |
| 5,810,524 | 9/1998 | Wirth, Jr. et al. . |
| 5,842,820 * | 12/1998 | Lee et al. ............................ 408/204 |

* cited by examiner

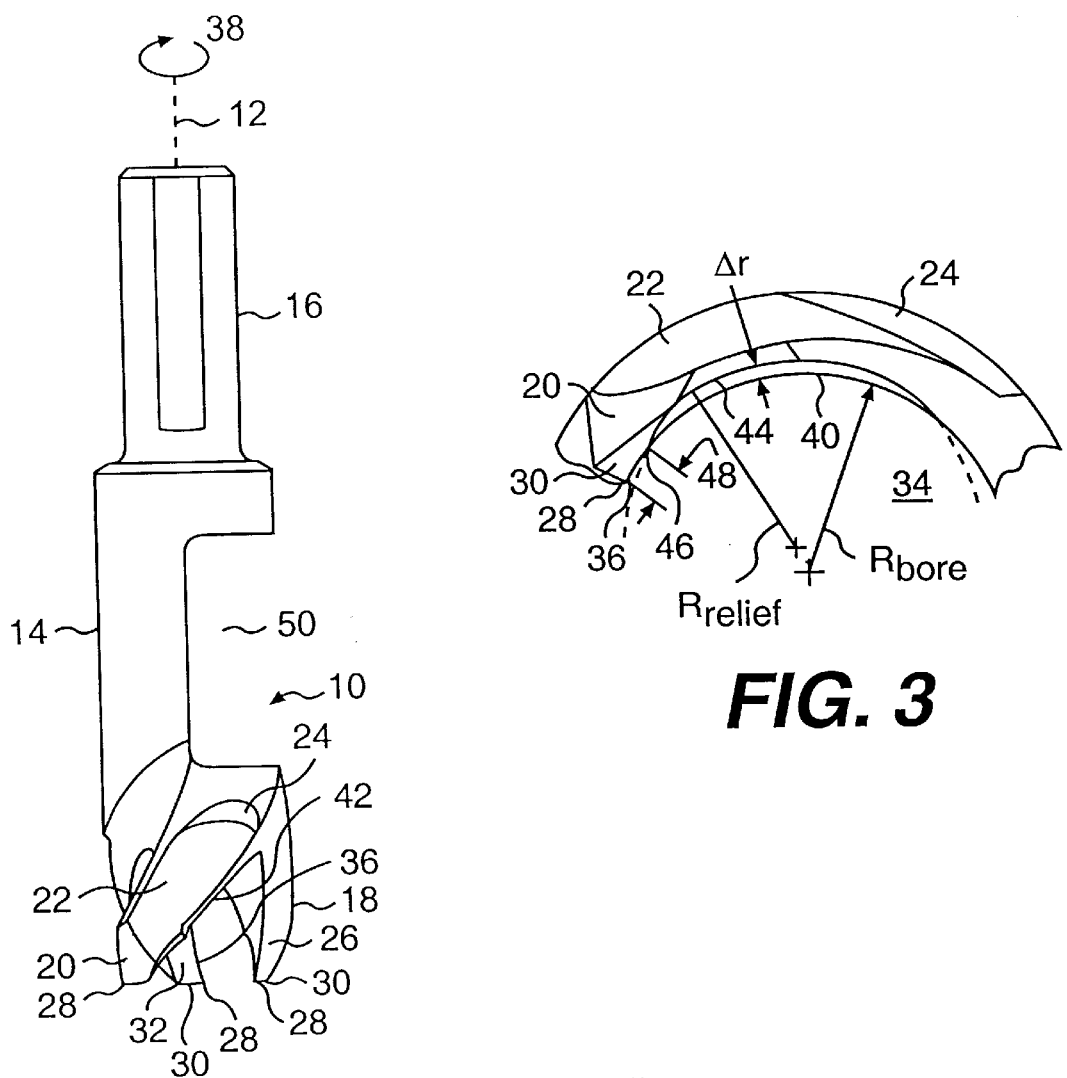
FIG. 1
FIG. 3
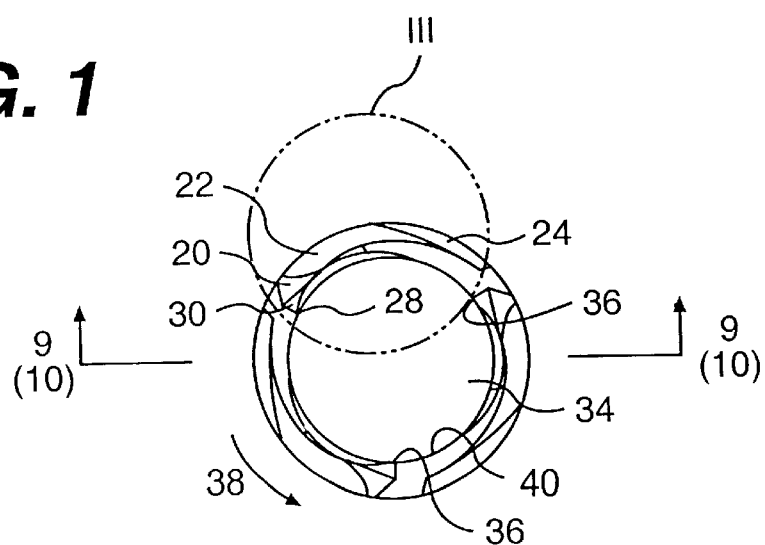
FIG. 2

PLUG CUTTER WITH RADIAL RELIEF AND PLUG EJECTING PORTION

This application claims the benefit of Provisional No. 60/153,083, filed Sep. 10, 1999.

BACKGROUND OF THE INVENTION

1. Field of the Invention

The present invention relates to plug cutters. More specifically, the present invention relates to plug cutters with cutting blades containing a radial relief so that, while the plug cutter is cutting a plug from a piece of stock, the cutting blades are less likely to burn the outer surface of the plug and the plug is less likely to break away prematurely from the piece of stock.

2. Description of the Related Art

There are two types of conventional plug cutters, those that do not have radially relieved portions on the cutting blades and those that do.

Both types of plug cutters typically include a main body portion with a shank extending from one end along the cutter's axis of rotation. They also include a plurality of cutting tines, or blades, extending axially from the opposite end of the main body. The plurality of cutting tines define a bore that is circular in cross section. The configuration of the bore corresponds to the configuration of the plug produced with the plug cutter.

Both types of plug cutters typically are produced, first, by drilling a bore axially into a cylindrical piece of steel and, second, by milling the cutting blades out of the resulting annular wall surrounding the bore. Each blade has an inner surface that faces radially inwardly toward the center of the bore.

For plug cutters that do not include radially relieved portions on the interior surfaces of the blades, the entire inner surface of each blade lies at a constant radial distance from the center of the bore. In other words, the entire inner surface of each blade contacts the outer surface of the plug as it is being cut from the stock material.

At the speeds with which plug cutters rotate, contact between the inner surface of the blades and the outer surface of the plug can generate a sufficient amount of frictional heat to burn the outer surface of the plug. In addition, friction between the outer surface of the plug and the inner surface of the blades can generate a sufficiently large torque on the plug to cause the plug to break away prematurely from the stock and become lodged in the bore of the plug cutter. Should this occur, the plug may be removed from the plug cutter only by destroying the plug.

It is also true that, in plug cutters that do not include radially relieved portions on the interior surfaces of the blades, because the entire inner surface of the each blade contacts the outer surface of the plug, the outer surface of the plug is formed by shearing, rather than by cutting. This results in the creation of a plug with a rough outer surface.

For plug cutters that do include radially relieved portions on the inner surfaces of the blades, such as those described in U.S. Pat. No. 5,810,524 (the '524 Patent), which is incorporated herein by reference, the inner bore of the plug cutter is not perfectly circular. Instead, a radial relief is provided on at least a portion of the inner surface of each blade between the leading and trailing edges. As described in the '524 Patent, the radially relieved portions establish a gap between the inner surface of the blades and the plug so that only a portion of the interior surface of the blades contacts the outer edge of the plug. This minimizes the effect of frictional and torsional forces on the plug and improves the plug cutter's performance so that it may produce a higher quality plug (for example, a plug with little or no surface burning or roughness).

Traditional plug cutters have one further disadvantage. After being cut from the stock material, the only way to remove the plug from the conventional plug cutter is to extract the plug from the radial end of the bore. Naturally, if the plug becomes lodged within the bore or cannot be easily removed from the bore, valuable production time may be lost while an operator takes the time to dislodge the plug from the cutter. Often, manual removal of the plug results in damage to the plug or to its destruction.

To facilitate removal of plugs from the central bore in the conventional plug cutter such as the one described in the '524 Patent, the central bore may be slightly tapered so that the diameter of the bore at the tips of the blades is slightly larger than the diameter of the bore closest to the shaft. With an outwardly tapered bore, an operator can remove the plug more easily from the bore of the plug cutter after it has been cut from the stock material. Additionally, with a slightly tapered bore, the plug may slide more easily out of the end of the plug cutter when the cutting operation is completed.

SUMMARY OF THE INVENTION

The present invention avoids the above-described disadvantages encountered with both of the conventional plug cutter designs by combining a radial relief on a portion of the inner surface of each blade with a plug ejecting portion. As the prior art illustrates, the radial relief improves the quality of plugs cut from stock material. The plug ejecting portion permits a plug, once cut from the stock material, to be pushed down the bore of the plug cutter toward the shaft until it can be removed from the side of the cutter through the plug ejecting portion. In cases where the plug is less than 1 inch thick, the plug may self-eject from the plug cutter through the plug ejecting portion as a result of the rotation of the plug cutter without any intervention by an operator.

Therefore, according to the present invention, a plug cutter is provided that is rotatable about an axis of rotation. The plug cutter includes a main body that has a longitudinal axis coinciding with the axis of rotation. The main body defines a bore extending axially therein. A shank extends axially from one end of the main body along the axis of rotation. A plurality of cutting blades extend axially from an opposite end of the main body and terminate in a distal end. The plurality of blades are adapted to cut a plug from a piece of stock as the plug cutter is rotated about the axis of rotation and advanced axially into the piece of stock. Each of the blades has leading and trailing edges and also an inner surface and a radially relieved portion facing the bore. The radially relieved portion begins at a relief start position and ends at a relief end position so that, as the plug cutter is cutting the plug, a gap is defined between an outer surface of the plug being cut and the radially relieved portion. The plug cutter also includes a plug ejecting portion extending through the main body to permit removal of the plug from the plug cutter.

Further in accordance with the present invention, a plug cutter is provided that is rotatable about an axis of rotation. The plug cutter includes a main body that has a longitudinal axis coinciding with the axis of rotation. The main body defines a bore extending axially therein. A shank extends axially from one end of the main body along the axis of rotation. A plurality of cutting blades extend axially from an opposite end of the main body and terminate in a distal end. The plurality of blades are adapted to cut a plug from a piece of stock as the plug cutter is rotated about the axis of rotation and advanced axially into the piece of stock. Each of the blades has leading and trailing edges and also an inner surface and a radially relieved portion facing the bore. The radially relieved portion begins at a relief start position and ends at a relief end position. Each blade is shaped so that, at a given axial position along each blade, a radial distance from the axis of rotation is smallest along the inner surface and largest along the radially relieved portion, so that, as the plug cutter cuts the plug, substantially only the inner surface of each blade contacts with an outer surface of the plug. The plug cutter also includes a plug ejecting portion extending through the main body to permit removal of the plug from the plug cutter.

Other objects, features and characteristics of the present invention will become apparent upon consideration of the following description and the appended claims with reference to the accompanying drawings, all of which form a part of the specification. Like reference numerals designate corresponding parts in the various figures of the drawings.

BRIEF DESCRIPTION OF THE DRAWINGS

FIG. 1 is a side elevation of a plug cutter according to the first embodiment of the present invention;

FIG. 2 is an end view of the plug cutter illustrated in FIG. 1, showing the cutting blades as viewed from the end of the plug cutter, looking into the bore defined by the cutting blades;

FIG. 3 is a partial view showing in detail the portion of FIG. 2 located within the circle III;

DETAILED DESCRIPTION OF THE PREFERRED EMBODIMENTS

Figure 5:
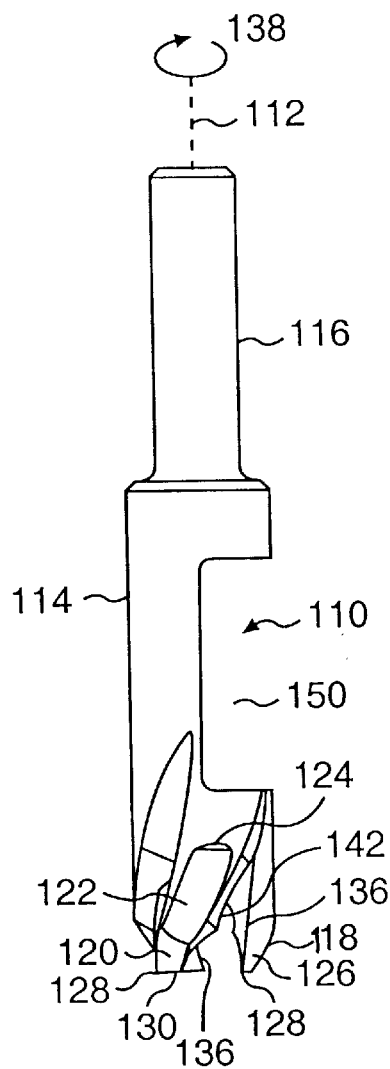
FIG. 5 is a side elevation of a plug cutter according to another embodiment of the present invention.

A plug cutter 10 according to a first embodiment of the present invention is shown in FIG. 1. As in conventional plug cutters, plug cutter 10 has an axis of rotation 12, a main body portion 14 having a longitudinal axis coinciding with axis of rotation 12, and a cylindrical shank portion 16 extending from one end of main body 14. Cylindrical shank portion 16 is adapted to fit into the jaws of a drill (not shown) in a manner known to those skilled in the art.

Plug cutter 10 is preferably formed from stainless steel, but other metals of suitable strength and hardness are acceptable.

A plurality of blades, or tines, 18 extend axially from an opposite end of main body 14. Although many conventional plug cutters comprise four such cutting blades extending from the body, in the first embodiment of the present invention, only three such cutting blades 18 are preferably provided so that cuttings (such as wood chips, for example), which are created when a plug is being cut, are more readily ejected from between cutting blades 18. In other words, the openings between cutting blades 18 are less likely to clog.

It is contemplated in the present invention, however, that more than three blades 18 may be fashioned to extend from main body 14 of plug cutter 10. Similarly, it may be desirable to fashion a plug cutter with fewer than three blades 18.

As shown in FIGS. 1–3, cutting blades 18 are formed with a number of facets, such as facets 20, 22, 24, and 26, and a cutting tip 28. As shown in FIG. 1, facets 30 lie on a horizontal plane. It is conceivable, however, that blades 18 could be formed so that facets 30 do not lie in a horizontal plane. Instead, facets 30 could be angled so that tip 28 extends somewhat downwardly.

Figure 4:
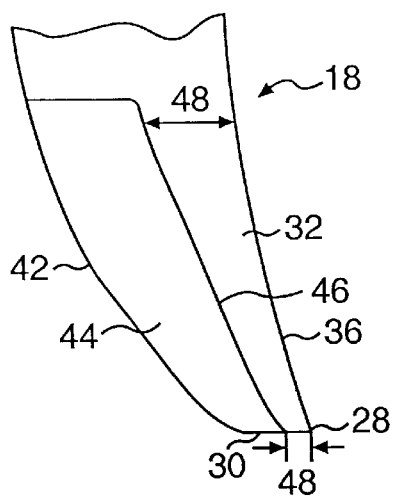
FIG. 4 is an enlarged view of one of the cutting blades, as viewed from the bore, showing the radially relieved portion on the inner surface of the blade.

As shown in FIG. 4, each blade 18 preferably has an inner surface 32 facing generally radially inwardly toward the center of bore 34 (i.e., toward axis of rotation 12 of plug cutter 10). When included on plug cutter 10, inner surface 32 of each blade 18 commences with a leading edge 36 that extends axially from cutting tip 28 along substantially the entire length of blade 18. Leading edge 36 defines the forwardmost portion of inner surface 32 with respect to the direction of rotation 38 of plug cutter 10 as shown in FIGS. 1 and 2. Leading edge 36 is the cutting edge of blade 18. As shown in FIGS. 2 and 3, leading edges 36 of blades 18 all lie on a circle 40 which corresponds to the circumference of bore 34. Circle 40 also corresponds to the configuration of an outer surface of a plug cut by plug cutter 10. Inner surface 32 extends from leading edge 36 to a position on blade 18 between leading edge 36 and a trailing edge 42.

As shown in FIGS. 3 and 4, at any given longitudinal (or axial) position along blade 18, leading edge 36 is disposed at a radius $R_{bore}$ from axis of rotation 12. So is inner surface 32. Radially relieved portion 44, however, is disposed at a radius $R_{relief}$ from axis of rotation 12. $R_{relief}$ need not be constant from its beginning to trailing edge 42, but, when it is constant, it is always the case that $R_{bore} > R_{relief}$. Thus, for a constant $R_{relief}$, at least a portion of blade 18 is provided with a measure of radial relief, $\Delta r = R_{bore} - R_{relief}$. As a plug is being cut with plug cutter 10, a gap, $\Delta r$, is defined between the plug being cut and radially relieved portion 44.

When $R_{relief}$ is not constant, it is possible for $R_{relief}$ to be greater than or equal to $R_{bore}$ in some locations. Radially relieved portion 44 is created by cutting away a portion of blade 18 using a circular cutter. The cutting radius of the blade cutter is always less than $R_{bore}$, even when $R_{relief}$ at a particular location happens to be equal or greater than $R_{bore}$.

Figure 9:
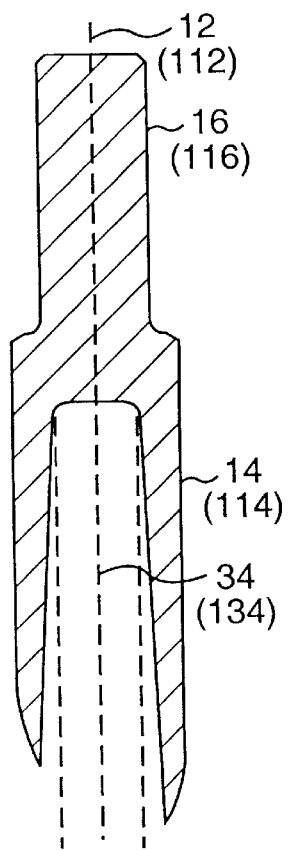
FIG. 9 is a cross-sectional view of the plug cutter shown in FIGS. 1 and 5, illustrating an embodiment where the tapered bore decreases in diameter progressively from the cutting blades toward the shank.

In the plug cutter of the present invention and as illustrated in FIG. 9, bore 34 may be flared or tapered outwardly along at least a portion of the axial length of bore 34 so that the diameter of circle 40 is smallest adjacent or near body 14 and greatest at or adjacent cutting tips 28. With blades 18 tapered in this manner, radius $R_{relief}$ of leading edge 36 of blade 18 will vary along at least a portion of the axial length of blade 18. When shaped in this manner, blades 18 are gradually tapered along substantially their entire length so that $R_{relief}$ varies along substantially the entire length of blade 18. In any event, in accordance with the invention, at any given axial position along blades 18, $R_{relief}$ may be constant or it may vary depending upon the manner in which radially relieved portion 44 is cut from blade 18.

With blades 18 tapered in the manner described above, a plug cut by plug cutter 10 of the presently preferred embodiment of the invention also will be tapered along substantially the entire axial length thereof.

Figure 10:
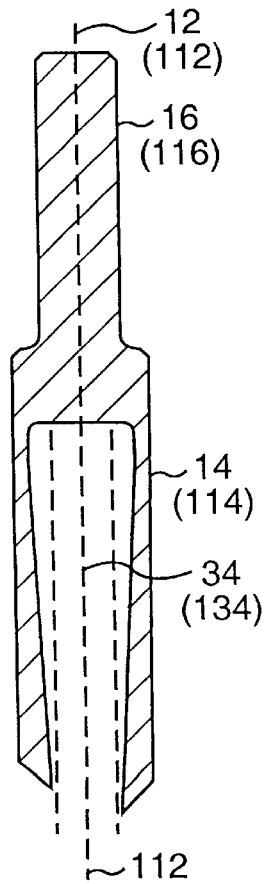
FIG. 10 is a cross-sectional view of the plug cutter shown in FIGS. 1 and 5, illustrating an embodiment where the tapered bore increases in diameter progressively from the cutting blades toward the shank.

In a second preferred embodiment, which is illustrated in FIG. 10, the taper's direction may be reversed. In other words, bore 34 may be flared or tapered inwardly along at least a portion of its axial length so that the diameter of circle 40 is largest adjacent or near body 14 and smallest at or adjacent cutting tips 28. With blades 18 tapered in this manner, radius $R_{relief}$ of leading edge 36 of blade 18 will vary along at least a portion of the axial length of blade 18 (just as in the first embodiment). When shaped in this manner, blades 18 are gradually tapered along substantially their entire length so that $R_{relief}$ varies along substantially the entire length of blade 18.

While not a preferred configuration, bore 34 defined by blades 18 could be substantially cylindrical, i.e, have substantially no taper, in which case a plug cut by such a plug cutter would be substantially cylindrical in shape. The dotted lines in FIGS. 9 and 10 illustrate the sides of bore 34 with substantially no taper.

As shown in FIG. 3, in the illustrated embodiment, the radial relief Δr increases gradually from about zero at a relief start position 46 behind leading edge 36 to a maximum value in a direction toward trailing edge 42. As discussed, the variation of Δr from relief start position 46 to trailing edge 42 is not critical and it need not be uniform.

When a plug is being cut by plug cutter 10 according to the present invention, substantially only inner surface 32 (the distance 48 on each blade 18 between leading edge 36 and relief start position 46) contacts the outer surface of the plug being cut while plug cutter 10 rotates. This minimal contact between blade 18 and the plug lessens the amount of burning due to frictional heat and reduces the likelihood that the plug will break off and become lodged in the plug cutter.

In addition, if plug cutter 10 is fashioned so that relief start position 46 coincides with leading edges 36 of blades 18, only leading edges 36 will contact the outer surface of the plug as it is being cut from the stock material. In other words, inner surface 32 will appear to be a line coincident with leading edge 36 of blade 18. When inner surface 32 is reduced essentially to a single line (coincident with leading edge 36), the frictional and torsional forces acting on the plug as it is cut from the stock material are greatly reduced.

Plug cutter 10 also is provided with a plug ejecting portion 50, which is essentially an extended notch cut through the side of main body 14 into bore 34. Plug ejecting portion 50 extends at least half-way through main body 14 to expose bore 34 to the exterior of plug cutter 10. A plug, once cut from the stock material, can be pushed through bore 34 from the blade section of plug cutter 10 into main body 14 where it can be removed from plug cutter through the plug ejecting portion 50. The addition of plug ejecting portion 50 greatly facilitates the removal of plugs from plug cutter 10 and, as a result, greatly speeds up the plug cutting process. It also minimizes instances where plugs become lodged in bore 34 and must be destroyed in order to be removed from plug cutter 10.

In addition, when bore 34 has been tapered so that the bore's radius, $R_{bore}$, is less at blades 18 than in main body 14, as shown in FIG. 10, the plugs cut from the stock material may even self-eject. This is particularly true for plugs that are less than 1 inch thick. During rotation of plug cutter 10, the taper provided in bore 34 causes the plugs to move axially down bore 34 toward plug ejecting portion 50 where they are thrown clear of plug cutter 10. This further facilitates the plug cutting process.

The third embodiment of the present invention is very similar to the first embodiment. To facilitate discussion of plug cutter 110, the reference numbers used in FIGS. 1–4 are repeated for like structures, except that they are preceded by a "1".

Figure 6:
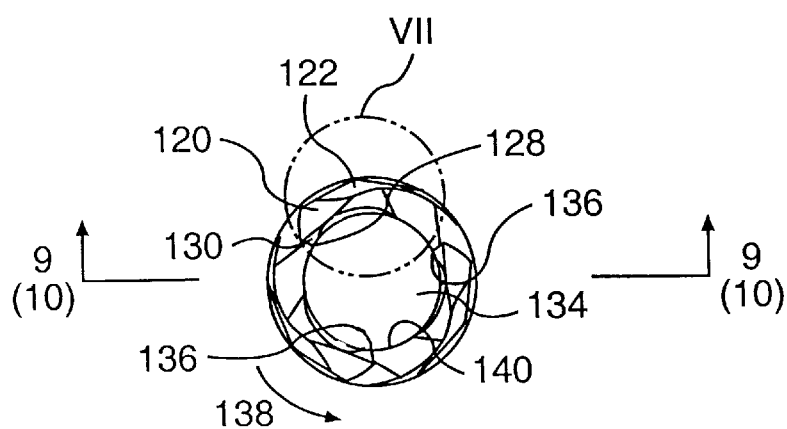
FIG. 6 is an end view of the plug cutter illustrated in FIG. 5, showing the cutting blades as viewed from the end of the plug cutter, looking into the bore defined by the cutting blades.

Like plug cutter 10, plug cutter 110 has an axis of rotation 112 around which plug cutter 110 rotates in direction 138 (as shown in FIGS. 5 and 6). Plug cutter 110 has a main body portion 114 that extends from a shank 116. Main body portion 114 and shank 116 have generally cylindrical shapes. Shank 116 is adapted to be connected to a drill bit in a manner generally known to those skilled in the art (but not shown).

Plug cutter 110 may be manufactured from stainless steel or any suitable material with an acceptable hardness and strength.

A plurality of blades 118 extend from main body 114. Like plug cutter 10, plug cutter 110 is shown with three blades 118. However, any number of blades 118 may be used depending upon the material from which the plug is to be cut.

Blades 118 include a number of facets 120, 122, 124, and 126. Each blade 118 also has a cutting tip 128. Each cutting tip 128 lies on a facet 130 that lies in a plane perpendicular to axis of rotation 112. As with facet 30, facet 130 need not lie in the horizontal plane but, instead, may be disposed at an angle to the horizontal plane so that cutting tip 128 extends downwardly from blade 118.

Figure 7:
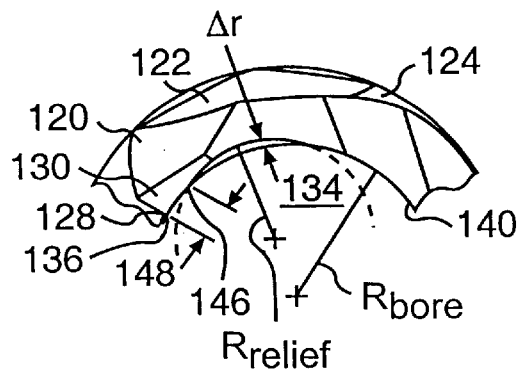
FIG. 7 is a partial view showing in detail the portion of FIG. 6 located within the circle VII.
Figure 8:
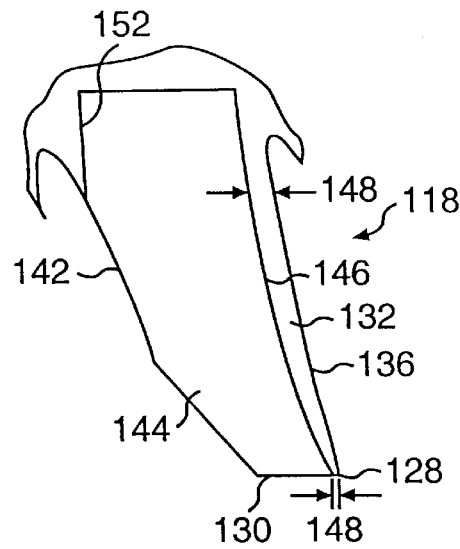
FIG. 8 is an enlarged view of one of the cutting blades, as viewed from the bore, showing the radially relieved portion on the inner surface of the blade.

Each blade 118 preferably has an inner surface 132 that extends a partial distance 148 from leading edge 136 toward trailing edge 142. As illustrated in FIGS. 7 and 8, starting at a predetermined distance from leading edge 136, radially relieved portion 144 extends from relief start position 146 to trailing edge 142. Like plug cutter 10, the radius of inner surface 132 coincides with the radius of bore 134, $R_{bore}$, which falls on circle 140. The radius of radially relieved portion 144, $R_{relief}$, while it need not be constant across the entire radially relieved portion 144, is smaller than $R_{bore}$ when it is constant. The difference between $R_{relief}$ and $R_{bore}$ is the same as that defined in connection with the discussion of plug cutter 10.

Leading edge 136 is the cutting edge of blade 118. Leading edge 136 (along with inner surface 132) lies on circle 140, which defines the outer surface of a plug cut by plug cutter 110.

As illustrated in FIG. 9, bore 134 of plug cutter 110 preferably tapers outwardly in the same manner described for plug cutter 10. In other words, bore 134 tapers outwardly along at least a portion of its axial length so that the diameter of circle 140 is smallest at the end of plug cutter 110 nearest to shank 116 and largest at cutting tips 128 of blades 118. Or, as illustrated in FIG. 10, bore 134 may have a reverse taper where $R_{bore}$ is larger near the shank end of bore 134 than at the blade end of bore 134. Of course, bore 134 need not be tapered at all.

Radial relief Δr gradually increases from 0 at relief start position 146 to a maximum value toward the trailing edge 142 of blade 118. In the third embodiment, however, it is not necessary that radially relieved portion 144 extend the entire distance to trailing edge 142 of blade 118. It is possible that a portion of blade 118 may not include radially relieved portion 144. In the third embodiment, radially relieved portion 144 terminates at relief end position 152. Relief end position 152 marks the transition from $R_{relief}$ back to $R_{bore}$.

As with plug cutter 10, the entirety of inner surface 132 may coincide with leading edge 136 to minimize the amount of surface contact between plug cutter 110 and the plug being cut from the stock material. With such a construction, inner surface 132 is essentially a line that coincides with leading edge 136.

Plug cutter 110 also includes a plug ejecting portion 150 that facilitates removal of the plug from bore 134. Plug cutter 110 operates in the same manner as plug cutter 10.

While the invention has been described in connection with what is presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the plug cutter with radial relief of the present invention can be made without departing from the novel aspects of this invention as defined in the claims.

What is claimed is:

1. A plug cutter, rotatable about an axis of rotation, comprising:
    a main body having a longitudinal axis coinciding with the axis of rotation, the main body defining a bore extending axially therein;
    a shank extending axially from one end of the main body along the axis of rotation;
    a plurality of cutting blades extending axially from an opposite end of the main body and terminating in a distal end, the plurality of blades being adapted to cut a plug from a piece of stock as the plug cutter is rotated about the axis of rotation and advanced axially into the piece of stock, each of the blades having leading and trailing edges, each of the blades also having a radially relieved portion facing the bore, wherein the radially relieved portion begins at a relief start position and ends at a relief end position, so that as the plug cutter is cutting the plug, a gap is defined between an outer surface of the plug being cut and the radially relieved portion; and
    a plug ejecting portion extending through the main body to permit removal of the plug from the plug cutter.

2. The plug cutter of claim 1, wherein the relief start position coincides with the leading edge.

3. The plug cutter of claim 1, wherein the relief start position is offset from the leading edge a distance toward the trailing edge.

4. The plug cutter of claim 1, wherein the relief end position coincides with the trailing edge.

5. The plug cutter of claim 1, wherein the relief end position is offset from the trailing edge a distance toward the leading edge.

6. The plug cutter of claim 2, wherein the relief end position coincides with the trailing edge.

7. The plug cutter of claim 2, wherein the relief end position is offset from the trailing edge a distance toward the leading edge.

8. The plug cutter of claim 3, wherein the relief end position coincides with the trailing edge.

9. The plug cutter of claim 3, wherein the relief end position is offset from the trailing edge a distance toward the leading edge.

10. The plug cutter of claim 1, wherein the bore tapers outwardly from the main body to the plurality of blades.

11. The plug cutter of claim 1, wherein the bore tapers inwardly from the main body to the plurality of blades.

12. The plug cutter of claim 1, wherein the bore is substantially cylindrically-shaped.

13. A plug cutter, rotatable about an axis of rotation, comprising:
    a main body having a longitudinal axis coinciding with the axis of rotation, the main body defining a bore extending axially therein;
    a shank extending axially from one end of the main body along the axis of rotation;
    a plurality of cutting blades extending axially from an opposite end of the main body and terminating in a distal end, the plurality of blades being adapted to cut a plug from a piece of stock as the plug cutter is rotated about the axis of rotation and advanced axially into the piece of stock, each of the blades having leading and trailing edges, each of the blades also having an inner surface and a radially relieved portion facing the bore, wherein the radially relieved portion begins at a relief start position and ends at a relief end position, each blade being shaped so that, at a given axial position along each blade, a radial distance from the axis of rotation is smallest along the inner surface and largest along the radially relieved portion, so that, as the plug cutter cuts the plug, substantially only the inner surface of each blade contacts with an outer surface of the plug; and
    a plug ejecting portion extending through the main body to permit removal of the plug from the plug cutter.

14. The plug cutter of claim 13, wherein the relief start position coincides with the leading edge.

15. The plug cutter of claim 13, wherein the relief start position is offset from the leading edge a distance toward the trailing edge.

16. The plug cutter of claim 13, wherein the relief end position coincides with the trailing edge.

17. The plug cutter of claim 13, wherein the relief end position is offset from the trailing edge a distance toward the leading edge.

18. The plug cutter of claim 14, wherein the relief end position coincides with the tailing edge.

19. The plug cutter of claim 14, wherein the relief end position is offset from the trailing edge a distance toward the leading edge.

20. The plug cutter of claim 15, wherein the relief end position coincides with the trailing edge.

21. The plug cutter of claim 15, wherein the relief end position is offset from the trailing edge a distance toward the leading edge.

22. The plug cutter of claim 13, wherein the bore tapers outwardly from the main body to the plurality of blades.

23. The plug cutter of claim 13, wherein the bore tapers inwardly from the main body to the plurality of blades.

24. The plug cutter of claim 13, wherein the bore is substantially cylindrically-shaped.

* * * * *